No. 895,975. PATENTED AUG. 11, 1908.
T. M. & W. DAVIES.
AUXILIARY RELIEF WHEEL RIM FOR MOTOR CARS AND VEHICLES.
APPLICATION FILED APR. 11, 1904.
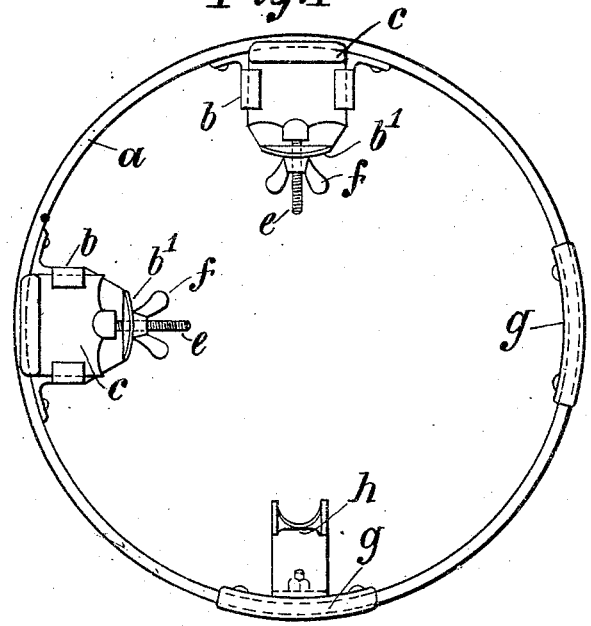
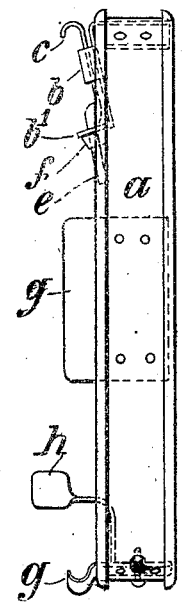
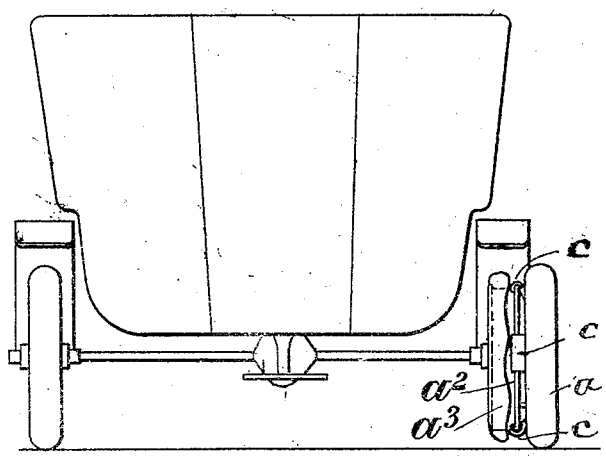

UNITED STATES PATENT OFFICE.

THOMAS MORRIS DAVIES AND WALTER DAVIES, OF LLANELLY, ENGLAND, ASSIGNORS TO THE STEPNEY SPARE MOTOR WHEEL, LIMITED, OF LLANELLY, ENGLAND.

AUXILIARY RELIEF WHEEL-RIM FOR MOTOR CARS AND VEHICLES.

No. 895,975.     Specification of Letters Patent.     Patented Aug. 11, 1908.

Application filed April 11, 1904. Serial No. 202,582.

*To all whom it may concern:*

Be it known that we, THOMAS MORRIS DAVIES and WALTER DAVIES, both citizens of the United Kingdom of Great Britain and Ireland, and residents of 40 Stepney street, Llanelly, in the county of Carmarthen, South Wales, England, have invented certain new and useful Improvements in Auxiliary Relief Wheel-Rims for Motor Cars and Vehicles, of which the following is a specification, such as will enable others skilled in the art to which it appertains to make and use the same.

This new rim or wheel is designed for use with the usual or existing road wheels of motor cars and road vehicles and particularly with wheels fitted with pneumatic tires. The new rims or wheels are provided with pneumatic, solid or any suitable tires, and are specially for use when the tire of the car or vehicle wheel is punctured or otherwise put out of use. They may, however, be used for such purposes as moving the car from place to place without soiling the tires on the car wheels.

The new rims or wheels, which we will call the auxiliary wheel rims, are provided with suitable fittings, including radially moving clips, guides with abutments, and adjustable securing means, such as screws and nuts, by which they can be removably fixed to the rims of car or vehicle wheels. One or more forks may also be provided to engage with one or more of the spokes of the car wheel to prevent the auxiliary wheel rim creeping on the car wheel.

We will now describe our invention with reference to the accompanying drawing, in which:—

Figure 1 shows in elevation one form of our invention consisting of a rim having two fixed and two adjustable clips and provided with a fork to engage with a spoke of the car wheel. Fig. 2 is a side view of Fig. 1. Fig. 3 is a rear elevation of a car showing one of our auxiliary wheel rims attached to one of the car wheels.

In Figs. 1 and 2, $a$ is the auxiliary wheel rim having fixed inwardly projecting radial guides or supports $b$, for adjustable clips $c$. The edge $b'$ of the support $b$ is turned at right angles and forms an abutment and has a hole through which is passed a screw $e$. This latter is attached at one end to the hook shaped clip $c$, and carries a fly or thumb nut $f$. Two fixed hook shaped clips $g$, $g$, are also attached to the auxiliary wheel rim and are formed of a sheet of metal bent over so as to form a grip or hold similar to the grip or hold formed on the sliding clip $c$.

A fork $h$ fastened to the rim $a$ is designed to engage with a spoke of the car wheel to prevent the auxiliary wheel creeping along the same.

In Fig. 3 we have shown an automobile viewed from the rear with one of our improved auxiliary wheel rims in position upon the rear wheel rim $a^2$, upon the right hand side, the tire $a^3$ of such wheel being shown as deflated and pushed partly to one side to show the manner in which the clips $c$ of the auxiliary wheel rim $a$ grip the rim $a^2$ of the main wheel.

What we claim as our invention is:

1. The combination of an auxiliary wheel rim, inwardly projecting radial guides fixed to said rim, an abutment upon each of said radial guides, a hook-shaped clip movably mounted in each of said radial guides and adapted to engage the outer periphery of a vehicle wheel rim, and adjustable means securing said hook-shaped clips to said abutments, substantially as herein shown and described.

2. The combination of an auxiliary wheel rim, inwardly projecting radial guides fixed to said rim, a perforated portion acting as an abutment carried by each of said radial guides, a hook-shaped clip mounted in each of said radial guides and adapted to engage the outer periphery of a vehicle wheel rim, a screw fixed to each of said hook-shaped clips and projecting radially through the perforated portion or abutment of the radial guide, and a nut on each of said screws acting against the said abutments, substantially as herein shown and described.

3. The combination of an auxiliary wheel rim, inwardly projecting radial guides fixed to said rim, an abutment upon each of said radial guides, a hook-shaped clip movably mounted in each of said radial guides and adapted to engage the outer periphery of a vehicle wheel rim, adjustable means securing said movable hook-shaped clips to said abutments, and fixed hook-shaped clips carried by the auxiliary rim also adapted to engage with the outer periphery of said vehicle wheel rim, substantially as herein shown and described.

4. The combination of an auxiliary wheel rim, inwardly projecting radial guides fixed to said rim, an abutment upon each of said radial guides, a hook-shaped clip movably mounted in each of said radial guides and adapted to engage the outer periphery of a vehicle wheel rim, adjustable means securing said movable hook-shaped clips to said abutments, fixed hook-shaped clips carried by the auxiliary rim also adapted to engage with the outer periphery of said vehicle wheel rim, and a fork carried by the auxiliary rim adapted to engage one of the spokes of said vehicle wheel, substantially as shown and described.

In witness whereof we have hereunto set our hands in presence of two witnesses.

THOMAS MORRIS DAVIES.
WALTER DAVIES.

Witnesses:
E. F. DAVIES,
W. D. THOMAS.